US010202860B2

(12) United States Patent
Hillier

(10) Patent No.: US 10,202,860 B2
(45) Date of Patent: Feb. 12, 2019

(54) NOZZLE GUIDE VANE PASSAGE

(71) Applicant: ROLLS-ROYCE plc, London (GB)

(72) Inventor: Steven Hillier, Manchester (GB)

(73) Assignee: ROLLS-ROYCE plc, London (GB)

( * ) Notice: Subject to any disclaimer, the term of this patent is extended or adjusted under 35 U.S.C. 154(b) by 302 days.

(21) Appl. No.: 15/214,219

(22) Filed: Jul. 19, 2016

(65) Prior Publication Data

US 2017/0138208 A1    May 18, 2017

(30) Foreign Application Priority Data

Jul. 28, 2015 (GB) .................................. 1513236.8

(51) Int. Cl.
| | |
|---|---|
| *B23P 15/02* | (2006.01) |
| *F01D 9/06* | (2006.01) |
| *C04B 35/00* | (2006.01) |
| *F01D 9/04* | (2006.01) |
| *F01D 9/02* | (2006.01) |
| *F01D 5/28* | (2006.01) |

(52) U.S. Cl.
CPC ............... *F01D 9/06* (2013.01); *B23P 15/02* (2013.01); *C04B 35/00* (2013.01); *F01D 9/02* (2013.01); *F01D 9/041* (2013.01); *F01D 5/282* (2013.01); *F01D 5/284* (2013.01); *F05D 2220/32* (2013.01); *F05D 2230/10* (2013.01); *F05D 2300/6033* (2013.01); *F05D 2300/614* (2013.01)

(58) Field of Classification Search
CPC ......... B23P 15/02; B23P 15/04; B23P 15/006; B23P 2700/01; Y10T 29/49336
USPC .......................... 264/257–258, 163, 150–151
See application file for complete search history.

(56) References Cited

U.S. PATENT DOCUMENTS

| | | | |
|---|---|---|---|
| 3,738,210 | A | 6/1973 | Fujio |
| 3,940,834 | A | 3/1976 | Lajovic |
| 4,028,459 | A | 6/1977 | LaJovic |
| 4,986,863 | A | 1/1991 | Denoel et al. |
| 2005/0076504 | A1 | 4/2005 | A. Morrison et al. |

(Continued)

FOREIGN PATENT DOCUMENTS

| | | |
|---|---|---|
| DE | 1 303 196 B | 4/1972 |
| EP | 2 233 697 A2 | 9/2010 |
| WO | 2014/143973 A1 | 9/2014 |

OTHER PUBLICATIONS

Dec. 5, 2016 Search Report issued in European Patent Application No. 16 18 0077.

(Continued)

*Primary Examiner* — Jason L Vaughan
*Assistant Examiner* — Amanda Meneghini
(74) *Attorney, Agent, or Firm* — Oliff PLC

(57) ABSTRACT

A method of constructing the nozzle guide passage may include the steps of: providing a tubular pre-form having a plurality of layers of unconsolidated CMC fibers in which the internal walls of the tubular preform provide either working surfaces which define the main gas path walls of the assembled nozzle vane, or extraneous wall portions which do not provide working surfaces of the assembled nozzle guide vane arrangement; cutting the wall portions to provide one or more flaps which remain attached to the pre-form via a connecting portion of wall; and, displacing the flap from a first pre-cut position, to a second consolidation position to provide one or more ancillary features.

15 Claims, 8 Drawing Sheets

(56) References Cited

U.S. PATENT DOCUMENTS

| | | | | |
|---|---|---|---|---|
| 2011/0008156 A1* | 1/2011 | Prentice | ................ | F01D 5/282 |
| | | | | 415/200 |
| 2012/0301312 A1 | 11/2012 | Berczik et al. | | |
| 2014/0314556 A1* | 10/2014 | Fremont | ................ | F01D 5/284 |
| | | | | 415/200 |
| 2016/0186583 A1* | 6/2016 | Alvanos | ................ | F01D 5/3007 |
| | | | | 416/219 R |

OTHER PUBLICATIONS

Feb. 9, 2016 Search Report issued in British Patent Application No. 1513236.8.

* cited by examiner

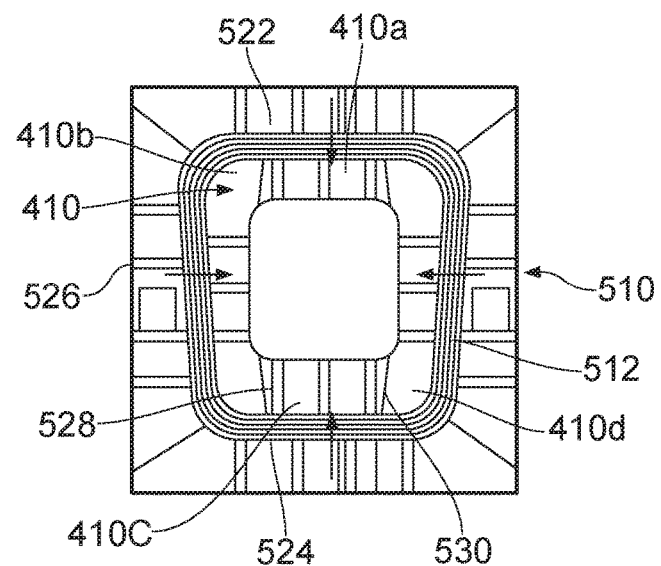
FIG. 5a
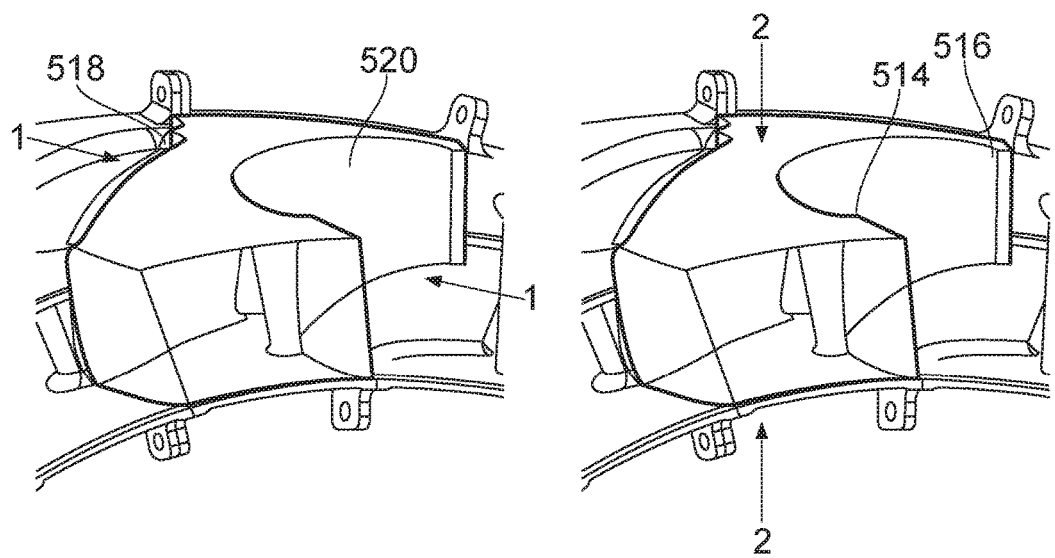
FIG. 5b                  FIG. 5c

NOZZLE GUIDE VANE PASSAGE

TECHNICAL FIELD OF INVENTION

The present invention relates to a Ceramic Matrix Composite material, CMC, nozzle guide vane passage, NGP, for a gas turbine engine. The NGPs can be assembled to provide an annular array of nozzle guide vanes. The NGPs are preferably constructed from a making the NGPs well suited for use in a particularly high temperature environment such as a high pressure turbine.

BACKGROUND OF INVENTION

FIG. 1 shows a ducted fan gas turbine engine 10 comprising, in axial flow series: an air intake 12, a propulsive fan 14 having a plurality of fan blades 16, an intermediate pressure compressor 18, a high-pressure compressor 20, a combustor 22, a high-pressure turbine 24, an intermediate pressure turbine 26, a low-pressure turbine 28 and a core exhaust nozzle 30. A nacelle 32 generally surrounds the engine 10 and defines the intake 12, a bypass duct 34 and a bypass exhaust nozzle 36. The engine has a principal axis of rotation 31.

Air entering the intake 12 is accelerated by the fan 14 to produce a bypass flow and a core flow. The bypass flow travels down the bypass duct 34 and exits the bypass exhaust nozzle 36 to provide the majority of the propulsive thrust produced by the engine 10. The core flow enters in axial flow series the intermediate pressure compressor 18, high pressure compressor 20 and the combustor 22, where fuel is added to the compressed air and the mixture burnt. The hot combustion products expand through and drive the high, intermediate and low-pressure turbines 24, 26, 28 before being exhausted through the nozzle 30 to provide additional propulsive thrust. The high, intermediate and low-pressure turbines 24, 26, 28 respectively drive the high and intermediate pressure compressors 20, 18 and the fan 14 by interconnecting shafts 38, 40, 42.

The performance of gas turbine engines, whether measured in terms of efficiency or specific output, is improved by increasing the turbine gas temperature. It is therefore desirable to operate the turbines at the highest possible temperatures. For any engine cycle compression ratio or bypass ratio, increasing the turbine entry gas temperature produces more specific thrust (e.g. engine thrust per unit of air mass flow). However as turbine entry temperatures increase, the life of an un-cooled turbine falls, necessitating the development of better materials and the introduction of internal air cooling.

In current engines, the high-pressure turbine gas temperatures are hotter than the melting point of the available superalloys meaning significant amounts of cooling air is required to prevent failure and premature aging. An alternative technology which helps alleviate the need for cooling air is ceramic matrix composites, or CMCs as they are commonly known.

Generally, CMC materials consist of ceramic fibres embedded within a ceramic body. There are different materials available for the fibres and body. Two of the more promising materials for gas turbine engines are silicon carbide fibres within a body of silicon carbide, so-called SiC/SiC, and aluminium oxide fibres within an aluminium oxide body, which is referred simply as an oxide CMC.

CMCs generally offer superior temperature and creep resistant properties for gas turbine engines and have a considerably lower density than their superalloy counterparts making them ideal for aeroengines. Further, because they have a higher temperature tolerance, CMC materials require less cooling which acts to increase specific fuel consumption further.

To help increase the mechanical robustness of CMC materials, it is advantageous to use continuous long fibres and avoid joins within a component. However, this is not immediately compatible with current architectures and assemblies of gas turbine engine components in which the aerofoils are provided within an annular gas path. This is particularly so for nozzle guide vanes which are conventionally formed in arcuate sections having a vane with radially inner and outer platforms. In a metallic cast component, the vane and platforms can be made as a homogenous structure in a casting process, with the absence of any joints between the vane and platform. However, this approach is not possible with CMCs due to the required lay-up of the fibres which prevents the acute transition from the vane to the platform. Creating the vanes and platforms separately is not considered viable due to difficulties associated with the subsequent joining of the separate components.

The present invention seeks to provide a nozzle guide vane assembly for a gas turbine engine and a method for creating the same.

STATEMENTS OF INVENTION

The present provides a method of constructing a nozzle guide vane arrangement according to the appended claims.

A method of constructing the nozzle guide passage may include the steps of: providing a tubular pre-form having a plurality of layers of unconsolidated CMC fibres in which the internal walls of the tubular preform provide either working surfaces which define the main gas path walls of the assembled nozzle vane, or extraneous wall portions which do not provide working surfaces of the assembled nozzle guide vane arrangement; cutting the wall portions to provide one or more flaps which remain attached to the pre-form via a connecting portion of wall; and, displacing the flap from a first pre-cut position, to a second consolidation position to provide one or more ancillary features.

The flap may be integrally formed with the pre-form. By integral it is meant that the connecting portion of wall provides an uninterrupted continuation of ceramic structure with the respective nozzle guide vane passage. Thus, the fibres within the connecting wall portion may extend between the flap and the respective nozzle guide passage. The fibres which extend between the internal wall and the respective nozzle guide passage may be continuous.

The non-working or extraneous surfaces of the pre-form may extend between the surfaces which define the working surfaces. The working surfaces may be the inner and outer radial platforms. Alternatively, the extraneous surfaces may extend from the pressure or suction surfaces. The extraneous surfaces may be integrally formed so as to be a continuation of a working surface portion. The ancillary portions may be one or more of an attachment feature such as a flap, lug, lobe, flange or other projection, or an internal wall.

Cutting the wall may be accomplished using any known suitable means. The cutting may include a mechanical shearing or slicing of the fibres and matrix for example, or may be accomplished with an appropriate non-contacting cutting method such as laser cutting.

The ancillary features may include one or more of an internal wall, a sealing portion and an attachment portion. The internal wall may be internal to the vane in the assembled nozzle guide vane arrangement. The sealing portion may be located local to a leading or trailing edge of a vane of the nozzle guide vane arrangement. The attachment portion may be in the form of an attachment lug.

The nozzle guide vane passage may include a flow direction which corresponds to the in use flow direction of the main gas path and wherein the extraneous wall portions extend radially between opposing inner and outer platforms and fore or aft from either of a pressure surface or a suction surface of each nozzle guide vane passage, the method further comprising: making a first cut along the flow length of the extraneous wall; making a second cut transverse to the flow direction so as to provide a flap with a connecting wall portion adjacent and along either of an inner or an outer platform.

The first cut and second cut may combine to form a single incision in two different directions. The first and second cut may together provide the flap. The second cut may extend from local to a terminal end of the first cut. There may be a plurality of second cuts.

The method may further comprise making a third cut transverse to the flow direction and radially opposite direction to the second cut.

The third cut may be directly opposed from the second cut and so displaced by 180 degrees. Alternatively, either or both of the second and third cut may be separated by an angle of less than 180 degrees. The first cut may be parallel to the flow direction. Either of the second and third cuts may be inclined to the flow direction by an angle. The angle may be between 135 and 45 degrees. The angle of inclination to the flow direction may be the same for each of the second and third cuts.

The method may further comprise providing first, second and optionally third cuts fore and aft of either or both of the pressure and suction surfaces of the pre-form.

Placing the flap in the consolidation position includes putting the flap in a radially outward or inward orientation relative to the respective platforms so as to provide attachment lugs on the exterior of the nozzle guide passage.

The reorientation may provide the outwardly facing flaps on the exterior of the nozzle guide passage. The radially outward orientation may be associated with the outer platform. The radially inward orientation may be associated with the inner platform. The flaps may provide attachment features for locating the nozzle guide passages relative to one another.

The method may further comprise applying compressive tooling to the extraneous features and consolidating the ancillary feature.

The method may further comprise machining the attachment lug to provide one part of a two or more part attachment feature. The lugs of adjacent NGPs could be attached by a c-shaped clip, a clamp, or an interlocking connection such as a dovetail arrangement or fixing device. The lugs could be arranged to be additionally or alternatively held within an engine casing slot by being assembled axially. The lugs may include surface features such as an irregular profile, a castellation, an undulation, a key or serration which engages with corresponding feature on the neighbouring vane. Hence, the machining may include boring a hole in an attachment lug or machining a groove therein to provide a re-entrant hollow or protruding lip to engage a corresponding lug or a clip or clamp. The lugs may interface directly or via an intermediate or interfacial part such as a shim or surface coating.

The nozzle guide vane passages may include a flow direction which corresponds to the in use flow direction of the main gas path and wherein the extraneous wall portions extend radially between opposing inner and outer platforms and fore or aft from either of a pressure surface or a suction surface of each nozzle guide vane passage, the method further comprising: making a first cut along the flow length of the extraneous wall; making a second cut along the flow length of the extraneous wall; wherein the first and second cuts along the flow length of the extraneous wall are radially separated so as to provide a connecting wall portion local to any of the pressure or suction surface trailing and leading edges.

The adjacent nozzle guide passages in the nozzle guide vane assembly may abut one another at a joining interface located at an upstream end and a downstream end of each nozzle guide passage, and the mid-portion of the NGPs is separated by an internal cavity of a vane, the method further comprising: reorienting the leading or trailing edge flap of the pressure or suction surface back on itself so as to be within the region which will provide internal cavity of the vane in the assembled nozzle guide vane arrangement.

The joining interface may extend through the upstream inner and outer radial platforms and a leading edge region, and the downstream inner and outer platforms and trailing edge region. Thus, the joining interface may extend axially from the most upstream or downstream end of the inner or outer platform, through each vane and back through the other of the outer or inner platform to the axial end thereof. As such, the join at the upstream and downstream portions of the NGV may be substantially C shaped in an approximate axial plane.

The leading or trailing edge flap may be shaped to correspond to the internal surface of the opposing suction or pressure surface of the adjacent nozzle guide vane passage so as to provide a sealing wall which is mateable with the adjacent nozzle guide vane to provide a sealing wall.

The sealing wall may be attached to the corresponding wall portion using one or more sealing components. The sealing components may include one or more additional fibre plys, or ceramic adhesive.

The method may further comprise consolidating the pre-form and machining a recess in the sealing wall to provide a rebate for receiving a portion of the opposing corresponding pressure or suction surface wall during assembly of the nozzle guide vane passage.

In providing the rebate in the sealing wall, a joint can be created within the vanes constructed from adjacent nozzle guide passages. The joint can include a lapped portion which comprises layers from a first and an adjacent second nozzle guide passages. The joint may be overlaid with one or more additional plys of ceramic fibres.

The second cut includes an axially extending portion to provide a sealing wall flap which includes a connecting wall portion local to the leading or trailing edge of either a pressure surface or suction surface. The third cut may include an axially extending portion.

The first and second cuts may be radially removed from the inner and outer platforms to connecting wall portions along the inner and outer platform walls thereby providing attachment lug.

Each nozzle guide passage may include sealing walls extending from both of the trailing edge and leading edge of a respective pressure or suction surface, the sealing walls being presented within the internal cavity of the vane when the nozzle guide arrangement is assembled, the method further comprising: joining the trailing and leading edge walls within the vane to provide a continuous internal wall within the vane cavity.

The internal wall may extend around the interior of the vane parallel to the vane wall. The internal wall may be spaced from the internal face of the vane wall so as to define a channel therebetween. The method may include either or both of providing one or more spacing formations one either or both of the vane wall inner surface or the opposing surface of the internal wall, the spacing formations maintaining the channel. The formations may include one or more projections or recesses in the respective wall.

There is described below a method of forming a nozzle guide vane arrangement, comprising: fabricating a plurality of nozzle guide passages, each nozzle guide passage comprising inner and outer radial platforms, a suction surface of a first vane, and a pressure surface of a second vane, wherein fabricating the nozzle guide passages comprises: a) providing a mandrel; b) feeding a tube of ceramic fibres over the mandrel, wherein the tube comprises an interwoven matrix of fibres which extend radially, circumferentially and axially around the nozzle guide passage; c) repeating step b) until a predetermined number of layers has been laid-up on the mandrel to provide a pre-form; d) consolidating the ceramic fibres; and, e) removing the mandrel; and f) assembling the plurality of nozzle guide passages into an annular array.

The tube may be a braided tube. The braided tube may include an interwoven matrix of individual or groups of fibres.

The method may further comprise laterally compressing one or more of the layers to aid conformity to an external surface of the mandrel and/or any underlying layer prior to feeding on a subsequent layer.

The compression may be applied to different areas of the braided layers in a predetermined order.

The lateral compression may be done with an inflatable tool. The lateral compression may be sequentially carried on selected sides of the mandrel in an order. The order may include a first step of compressing the primary working surfaces or areas of the pre-form, a second step of the secondary working surfaces or areas of the pre-form, and third, extraneous surfaces or areas of the pre-form. Primary working surfaces may include the parting line which separates the respective NGPs, the pressure surface, the suction surface, the leading edge and the trailing edge. The secondary working surfaces may include the inner and outer platforms. Extraneous surfaces and areas may include those which are subsequently used to provide additional attachment or sealing features. The inflatable tool may be segmented, with each segment corresponding to an axial extent of the NGP. Inflating the segmented inflatable tool may include inflating different segments along the axial length of the tool in a predetermined order.

The method may further comprise compressing a plurality of layers prior to and during consolidation of the ceramic fibres.

The compression of a plurality of layers for consolidation may be done by separate tooling to the lateral compression. The consolidation tooling may be rigid.

The mandrel may be a multi-part assembled component and removing the mandrel includes disassembling.

The mandrel may include a terminal end, and a feed-on end on to which the braided layers are fed, the method further comprising clamping each braided layer at the terminal end of the mandrel.

The method may further comprise expanding the radius of the tube subsequent to clamping the braid at the proximal end.

The method may further comprise cutting each layer prior to feeding on a subsequent layer.

The pre-form may include extraneous surfaces which do not provide main gas flow path facing walls in the assembled nozzle guide vane arrangement, wherein the method further includes cutting and re-orienting a portion of the non-working surfaces to provide one or more ancillary features.

The non-working or extraneous surfaces of the pre-form may extend between the surfaces which define the working surfaces. The working surfaces may be the inner and outer radial platforms. Alternatively, the extraneous surfaces may extend from the pressure or suction surfaces. The extraneous surfaces may be integrally formed so as to be a continuation of a working surface portion. The ancillary portions may be one or more of an attachment feature such as a flap, lug, lobe, flange or other projection, or an internal wall.

The method may further comprise applying a longitudinal tension to the tube prior to cutting or compressing the tube. The tube is applied from a rotatable spool.

The method may further comprise laying down one or more of: interlayer individual fibres, fibre bundles or fibre plys in between tubes of fibres. The fibre bundles may be a plurality of longitudinally arranged juxtaposed individual fibres. The fibre plys may be include one or more pre-prepared sheets of interwoven fibres.

The inter-layer fibres or plys may be one or more of: wound around the outside of a preceding layer a plurality of times at a common axial location relative to the longitudinal axis of the mandrel; wound around the outside of the preceding layer whilst extending along the longitudinal axis; and, extending longitudinally along the mandrel in a direction which is common to the longitudinal axis of the mandrel.

Also described is a method of forming a nozzle guide passage comprising inner and outer radial platforms, a suction surface of a first vane, and a pressure surface of a second vane, the method comprising: a) providing a mandrel; b) feeding a tube of ceramic fibres over the mandrel, wherein the tube comprises an interwoven matrix of fibres which extend radially, circumferentially and axially around the nozzle guide passage; c) repeating step b) until a predetermined number of layers has been laid-up on the mandrel to provide a pre-form; d) consolidating the ceramic fibres; and, e) removing the mandrel; and f) assembling the plurality of nozzle guide passages into an annular array.

A nozzle guide vane assembly made by the described methods may comprise: a plurality of nozzle guide vane passages arranged in an annular array, each nozzle guide passage comprising inner and outer radial platforms, a suction surface of a first vane, and a pressure surface of a second vane, wherein the passages are made from a braid of consolidated CMC fibres, the braid comprising an interwoven matrix of fibres which extend circumferentially around and axially along the nozzle guide passage.

It will be appreciated that the term circumferentially is not intended to limit the mandrel to being cylindrical in form, or circular in cross-section. Rather, the term circumferentially is used to denote a path which extends circumferentially around the longitudinal axis of the mandrel at a fixed or changing radius.

There is described below a nozzle guide vane assembly comprising: a plurality of nozzle guide vane passages arranged in an annular array, each nozzle guide passage comprising inner and outer radial platforms, a suction surface of a first vane, and a pressure surface of a second vane, wherein the nozzle guide passages are made from a plurality of layers of ceramic fibres held in a ceramic matrix, wherein a first nozzle guide passage includes at least one attachment lug attaching the nozzle guide passage to either or both of an engine casing and an adjacent second nozzle guide passage, the attachment lug being integral with the first nozzle guide passage.

The platform regions may extend upstream and downstream of the vanes so as to provide an annular inlet and outlet to the annular array of vanes and the attachment lugs extend radially outwards of the annular inlet or outlet.

Each nozzle guide passage may include a peripheral edge along which it joins the adjacent nozzle guide passage in the arrangement and wherein the attachment lugs are placed at or along the peripheral edge.

Adjacent nozzle guide passages may include corresponding attachment lugs, the corresponding attachment lugs being attached together so as to couple adjacent nozzle guide passages in the nozzle guide vane arrangement.

Each nozzle guide passage may include either or both of at least one upstream attachment lug which is local to the most upstream part of the nozzle guide passage and one downstream lug which is local to a most downstream part of the nozzle guide vane.

The attachment lug may comprise a plurality of ceramic fibres running therethrough, the ceramic fibres continuing uninterrupted between the lug and a corresponding/adjoining portion of one or more of the inner or outer radial platform, the suction surface and the pressure surface.

Each attachment lug may include a through-hole for receiving a fixation device.

The lugs of adjacent NGPs could be carried out with a c-shaped clip, a clamp, or an interlocking connection such as a dovetail arrangement. The lugs could be arranged to be additionally or alternatively held within an engine casing slot by being assembled axially. The lugs may include surface features such as an irregular profile, a castellation, an undulation, a key or serration which engages with corresponding feature on the neighbouring vane. The lugs may interface directly or via an intermediate or interfacial part such as a shim or surface coating.

Adjacent nozzle guide passages may abut one another at a joining interface located at an upstream end and a downstream end, and the mid-portion of the NGPs being separated by an internal cavity of a vane.

The joining interface may extend through the upstream inner and outer radial platforms and a leading edge region, and the downstream inner and outer platforms and trailing edge region. Thus, the joining interface may extend axially from the most upstream or downstream end of the inner or outer platform, through each vane and back through the other of the outer or inner platform to the axial end thereof. As such, the join at the upstream and downstream portions of the NGV may be substantially C shaped in an approximate axially extending plane.

Either or both of the upstream and downstream joints may include a lapped portion which comprises layers from a first and an adjacent second nozzle guide passages.

A pre-form for a nozzle guide passage may comprise: a plurality of layers of laid ceramic fibres defining inner and outer radial platforms, a suction surface of a first vane, and a pressure surface of a second vane, wherein either or both of the inner or outer platforms extend axially beyond the first and second vanes to provide a radially inner and outer platform extensions, wherein the platform extensions are joined by radially extending walls.

A portion of one or more radially extending wall may have been reoriented so as to provide a radially projecting attachment lug which resides outside of the gas flow path which is provided by the nozzle guide passage.

The ceramic fibres are part of a braid, wherein the braid comprises an interwoven matrix of fibres which extend radially, circumferentially and axially around the nozzle guide passage.

A mandrel for forming a ceramic matrix composite preform component thereon, the mandrel for receiving a braid of interwoven matrix of fibres, may comprise: a guide at a first end; a tooling portion having an external profile which corresponds to the internally facing surfaces of the ceramic matrix composite component; and a clamping region provided at a second end; wherein the guide, tooling portion and end clamping region are arranged in a series relation to one another.

The guide portion may include a divergent profile extending from the first end towards the tooling portion.

Either or both of the guide and the clamping region may be detachably attached to the tooling portion.

The mandrel may further comprise at least one member extending along the longitudinal axis of the mandrel, wherein member provides the detachable attachment.

The tooling portion comprises a plurality of assembled parts. The guide portion may include a stepped profile which includes a plurality of features which project away from the general plane of the guide portion, the stepped profile allowing the attachment of one or more layers of ceramic fibre. The stepped portion may include a plurality of depressions, ridges or flat portions which extend circumferentially around the guide to provide the projecting features, wherein the plurality of depressions, ridges or flat portions are distributed along the axial length of the guide. The mandrel may be multi-piece to aid extraction (required on a re-entrant design).

The tooling portion may include a plurality of gas flow apertures for allowing a flow of gas to pass to a plurality of locations on an exterior surface of the mandrel.

A consolidation tooling for receiving the mandrel may include a plurality of parts which, in combination, provide mandrel facing surfaces which correspond to the profile of the exterior surface of the pre-form component which is to be formed on the mandrel.

The consolidation tooling may further comprise a plurality of gas flow apertures which extend from the mandrel facing surfaces to an exterior thereof.

The gas flow apertures and mandrel flow apertures may be offset relative to each other in use, such that the gas flow path between the gas flow apertures is defined by a portion which extends along the plane of the wall in between the mandrel and the consolidation tooling.

A clamping arrangement for clamping the consolidation tooling around the mandrel which may be actuable relative to the mandrel such that selected regions of mandrel can be compressed by the consolidation tooling at any one time.

The clamping arrangement may be rigid tooling or inflatable and conform to the fibre surface. The rigid tooling may be different for subsequent layers to allow for the difference in external shape of the pre-forms numbers of layers increases.

A kit of parts for creating the CMC nozzle guide passage may comprise: the consolidation tooling and mandrel.

A nozzle guide vane may arrangement comprise: a plurality of separate nozzle guide vane passages which are joined together in an annular array, each nozzle guide passage comprising inner and outer radial platforms, a suction surface of a first vane, and a pressure surface of a second vane such that each vane in the annular array includes a pressure surface of a first nozzle guide passage and a suction surface of a second nozzle guide vane, wherein the nozzle guide vane passages are made from a ceramic matrix composite material having a plurality of ceramic fibres held within a ceramic matrix and wherein each vane in the assembled arrangement includes a cavity which houses an internal wall, the internal wall being an integral part of either the first or second nozzle guide passage.

By integral wall it is meant that the wall is formed so as to be a continuous ceramic structure with the respective nozzle guide vane passage. Thus, the fibres within the internal wall may extend between the internal wall and the respective nozzle guide passage. The fibres which extend between the internal wall and the respective nozzle guide passage may be continuous. The internal wall and nozzle guide passage may be formed from the same laid up fibres or plys of fibres.

The internal wall may include two internal wall portions which extend from different regions of the first or second nozzle guide passage.

One internal wall portion may extend from a region local to the trailing edge of the vane in which it is located. Additionally or alternatively, another internal wall portion may extend from a region local to the leading edge of the vane in which it is located.

One or both of the wall portions may include a rebate, chamfer, castellation or saw-tooth edge for mating with a corresponding portion of another wall portion.

The internal wall portions may be connected by ceramic fibres or plys which lie over the join.

The internal wall may extend around a longitudinal axis to provide a tubular structure.

The tubular structure may include a portion defined by an internal wall and a portion defined by an interior surface of a gas facing surface of the nozzle guide passage of which the internal wall is an integral part thereof.

A face of the internal wall may include a rebated portion defined by a shoulder, the shoulder providing a mating surface for receiving a corresponding surface of a vane wall of a circumferentially adjacent nozzle guide vane when assembled.

Interface might house a seal and/or allowed controlled leakage through or cooling. Conversely the cooling air may be controlled by then internal tube and allow a flow through, finally the cooling air may be restricted upstream allowing a correct an amount of cooling air through. The closed gap between components caused by the chocked set would prevent injection. Internal surfaces near the join could be treated with coating to prevent damage should any annulus gas enter the gap.

The internal wall is formed on either the pressure or the suction surface wall side of the nozzle guide vane, and the interior of the vane wall of the other of the pressure or suction side includes a rebate.

The internal wall may extend around the interior of the vane parallel to the vane wall. The internal wall may be spaced from the internal face of the vane wall so as to define a channel therebetween.

Either or both of the vane wall and the internal wall may include one or more spacing formations which contact the vane wall so as to maintain the channel therebetween.

The internal wall may include one or more apertures to provide a flow of cooling air through the wall and on to the internal wall of the vane.

Nozzle guide passages for assembly in an annular array to provide a nozzle guide vane arrangement for a gas turbine engine, may each comprise radially inner and outer platforms, a suction surface of a first vane, and a pressure surface of a second vane such that each vane in the annular array includes a pressure surface of a first nozzle guide passage and a suction surface of a second nozzle guide vane.

DESCRIPTION OF DRAWINGS

Embodiments of the invention will now be described with the aid of the following drawings of which:

FIGS. 5a, 5b and 5c show the clamping order for the external tooling. FIG. 5a shows a transverse section through the NGP pre-form at a mid-portion thereof. FIGS. 5b and 5c show perspective views.

DETAILED DESCRIPTION OF INVENTION

Figure 2A:
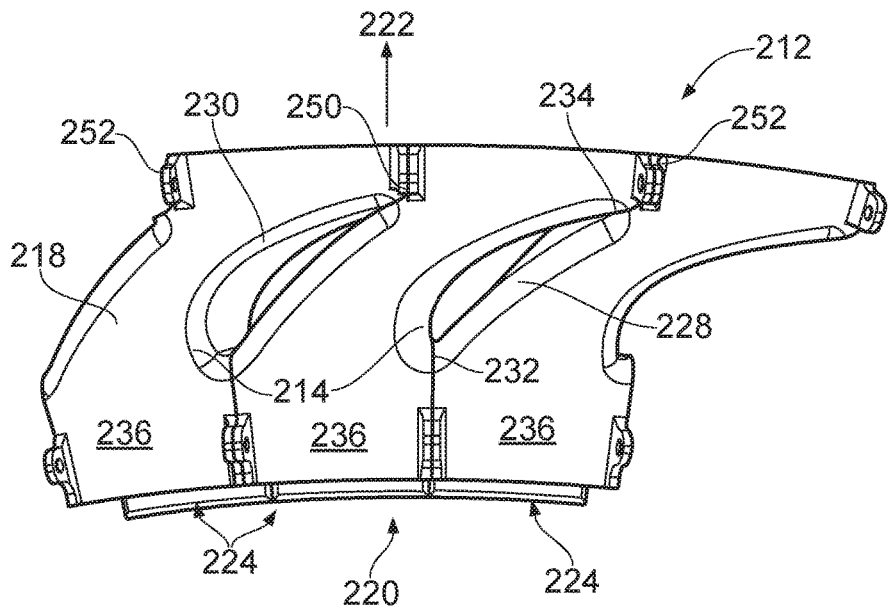
FIGS. 2a and 2b respectively show a radially inward view and axial upstream end view of a nozzle guide vane arrangement of the present invention.
Figure 2B:
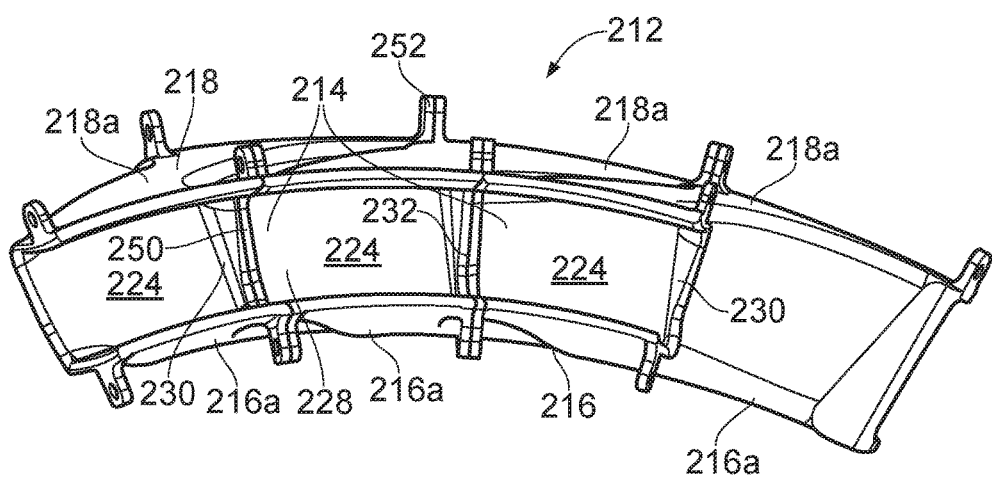

FIGS. 2a and 2b show a nozzle guide vane (NGV) arrangement 212 according to the present invention. The NGV arrangement 212 includes a plurality of aerofoils 214 in the form of vanes which are distributed in an annular array (partially shown) around the principal rotational axis of the engine 31. The inner and outer radial ends of the vanes terminate in radially inner 216 and outer 218 platforms which extend circumferentially around the engine 10 and between adjacent vanes 214 to provide a full annular gas path. The platforms 216, 218 extend fore and aft of the vanes 214 to provide the arrangement with an upstream annular inlet 220, and a downstream annular outlet 222. The combination of the vanes 214 and platforms 216, 218 define passages 224 through which hot gas flow passes when the turbine is in use. The vanes 214 include pressure 228 and suction 230 surfaces extending between leading 232 and trailing 234 edges and act to turn the hot gas flow from the upstream to the downstream so that its incident angle upon exit is optimised for interaction with a set of downstream rotatable turbine blades as is well known in the art.

The NGV arrangement 212 is constructed from a plurality of circumferentially adjacent nozzle guide passages, NGPs, 236 with each NGP 236 providing an arcuate segment of NGV annulus. The NGPs 236 are constructed from irregular box-like sections which have an inlet to receive the upstream gas flow, an outlet to exhaust the turned gas flow downstream. The inlets and outlets of circumferentially adjacent NGPs combine to make the annular inlet 220 and outlet 222 of the NGV.

The walls of each NGP 236 box section are provided by working surfaces which define the gas flow path in each passage. The working surfaces include a gas facing suction side 230 of a first vane, and a gas facing pressure surface 228 of a second vane. Thus, a complete vane comprises two NGPs 236 in which the pressure surface 228 of one NGP combines with a suction surface 230 of a circumferentially adjacent NGP to provide the continuous wall of an aerofoil.

The radially inner 216a and outer 218a platform portions of the NGPs 236 extend between and provide a continuation from the respective pressure and suction surfaces of each passage. The individual platform portions 216a, 218a, combine with adjacent NGP platform portions to provide the full annular platforms 216, 218 which radially bound the hot gas path of the turbine.

The radially inner 216a and outer 218a platform portions of each NGP 236 extend fore and aft of the leading 232 and trailing 234 edges respectively to provide landings which define the inlet and outlet to the aerofoil passageways 224. The landings abut circumferentially adjacent NGPs at corresponding joints to provide a full annular inlet 220 and outlet 222. Thus, the leading 232 and trailing 234 edges of the vanes 214 in the assembled NGV arrangement are axially separated and within the upstream and downstream terminal ends of the nozzle guide passageways 236.

As will be appreciated from the description above, the individual NGPs 236 are defined and separated by a parting line or joint 250. The abutting surfaces of the joint 250 between adjacent NGPs 236 are provided at the upstream and downstream ends of the NGPs only, with the division between the adjacent NGPs 236 at the mid-portion being provided by the aerofoil sections.

Thus, the joint between the NGPs 236 on the upstream end of the arrangement extends from the axially most upstream end of the inner 216 or outer 218 platform, through each vane 214 and back through the other of the outer 218 or inner 216 platform to the axial end thereof. Thus, the join is substantially C shaped in an approximate axial plane. The location of the joint through the aerofoil portion may vary, but in the example shown in FIGS. 2a and 2b, passes through the leading edge 232 region of the vane 214. The exact position of the join 250 in the aerofoil will be dependent on the operating conditions of the engine and the chosen method of sealing to prevent ingress of hot gas within the vane, or excessive egress of cooling air into the main gas path.

The downstream end joint is similar to the upstream end joint in that it extends from the axial extents of platforms 216a, 218a and through the aerofoil 214. The parting line through the aerofoil in the example of FIGS. 2a and 2b is through the trailing edge 234 region of the aerofoil. However, as with the leading edge join, this position may be varied for a given architecture or method of joining. A method of joining the respective abutting NGPs 236 is discussed in more detail below.

The nozzle guide vane arrangement 212 includes integral attachment lugs 252 which extend radially away from the inner 216 and outer 218 platforms so as to be approximately perpendicular thereto. The lugs 252 may be circumferentially offset from a radial line which extends from the principal axis of rotation of the engine whilst extending parallel to a radial direction. In this way, the lugs may be angled relative to the tangent of the inner and outer platforms whilst still extending in a predominantly radial direction. Hence, the lugs 252 may be angled to the radial line where required.

In the example shown in FIGS. 2a and 2b, each NGP 236 includes an attachment lug 252 towards the peripheral corners of each platform 216, 218. However, it will be appreciated that other configurations are possible. For example, additionally or alternatively, there may be attachment lugs 252 in a mid-region of each platform section and extending from the most upstream or downstream edge thereof. There may be a different number of lugs on the upstream and downstream ends.

In the example shown, each of attachment lugs 252 of the corresponding NGPs 236 are similarly sized and orientated on circumferentially opposing sides of the platforms 216, 218 so that they are aligned with and abut the attachment lugs on the adjacent NGP 236.

The attachment lugs 252 each have a through-hole 254 for receiving a fixation or location device such as a bolt, pin or daze fastener which can securely attach the NGPs together and or to an engine casing (not shown). Other fixation or location devices maybe contemplated in other arrangements.

The locating or fixation devices may include features which allow for predetermined relative movement such as race track shaped holes which allow some relative movement of the NGP and engine casing about the fixation device which may be fixed attached to the engine casing. Such an arrangement may be advantageous for allowing some differential thermal expansion for example. In some arrangements, the NGPs may be additionally or alternatively be located within corresponding retention features, such as keys, slots or recesses within the engine casing.

The NGPs 236, and thus resultant NGV arrangement 212, is made from a ceramic matrix composite, CMC, material. To maximise the strength of a CMC component, it is preferable to increase the unbroken length of the fibres so far as possible. The NGP arrangement achieves this by forming the box-like sections from a braided tube of fibres which are shaped over a mandrel before being consolidated and machined. However, it will be appreciated that some of the examples of a CMC NGP provided below do not require braided layers of fibre, or layers provided by a braided tube as per the description below.

FIGS. 3a to 3e show pictorially the process steps for making a CMC NGP 236 using a braided tube 312. The process requires the use of a mandrel 410 to form the internal shape of the NGP 236 from the fibres of the braided tube 312 prior to consolidation. The mandrel 410 is shown in greater detail in FIG. 4. The process steps required for consolidation of the component are dependent on the type of CMC system being used and not discussed in detail here except where features of the examples provided are specific to a particular CMC system.

The braided tube 312 is prefabricated and includes a matrix of interwoven strands of ceramic fibre. The fibres within the braided tube 312 are helically arranged and extend along the length of the braid in either one of a clockwise or an anticlockwise direction. Each of the clockwise fibres is woven over and under alternating anticlockwise fibres and vice versa. Such woven braids are known in other industries such as the electrical cable industry where conductive braids are used to provide screening around data lines etc. However, such braids are not known to be made from ceramic fibres.

The construction of the braided tube 312 is such that longitudinal compression causes the width of the tube to increase as the pitch of the helical fibres decreases, whilst longitudinal extension of the tube 312 causes the diameter to reduce. The fibres which go to make up the braid may be of a similar cross-sectional shape and diameter, but may vary. In the described example the fibres are circular in cross section. The fibres may be of uniform size.

The braided tube 312 is provided on a rotatable spool 314 which is turned by a drive 316. The drive 316 can be one known in the art but should preferably be operable to rotate the spool 314 at a particular speed both to allow the braid 312 to be let out as it is fed over the mandrel 410, and also to place the braid 312 under tension as required in some instances. The spool could be turned by hand.

Figure 1:
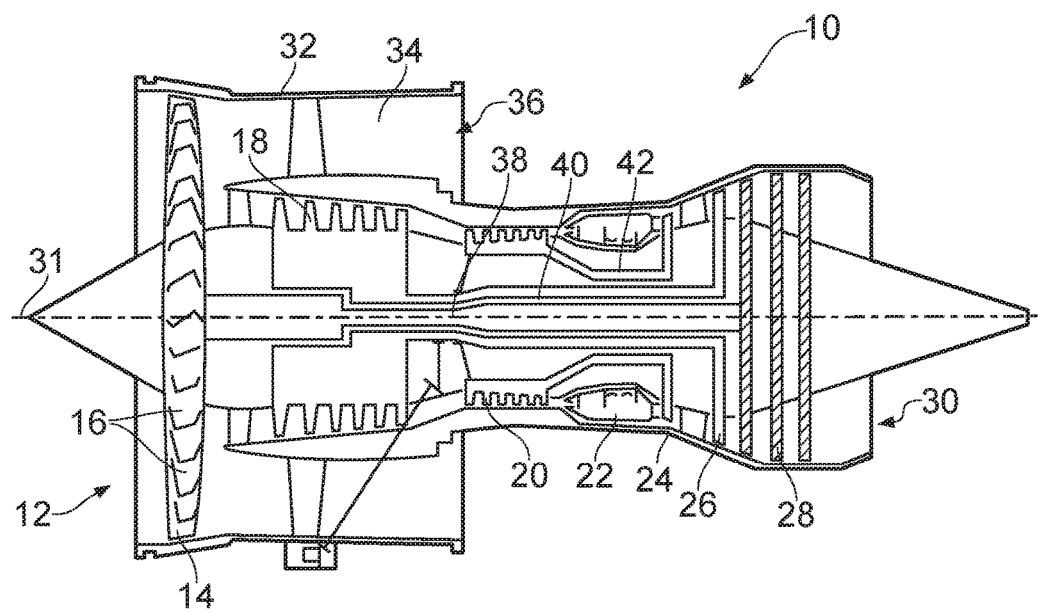
FIG. 1 shows a conventional three shaft gas turbine engine, described above in the Background of Invention section.
Figure 4:
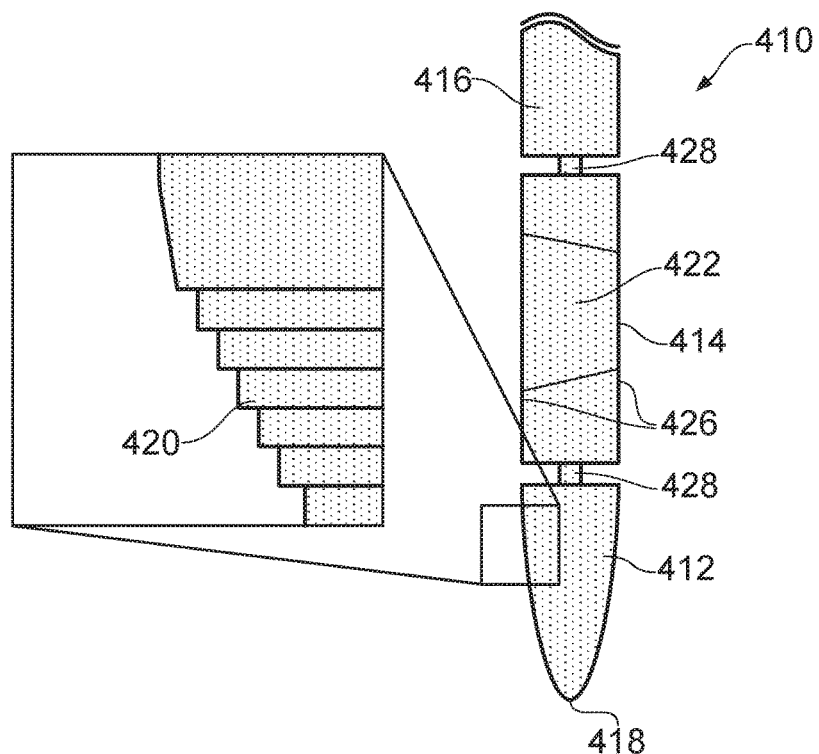
FIG. 4 shows a mandrel used to create the nozzle guide passage.

FIG. 4 shows a mandrel 410 which can be used to fabricate an NGP. The mandrel 410 is used as an internal mould around which braided layers are placed upon and caused to conform to the external shape thereof. Layers of the braid are built up in succession and compressed so as to be correctly contoured with respect to mandrel 410. The layers are retained in place with external tooling during a consolidation process which joins the individual fibres and layers of fibres to provide a substantially rigid body which can be removed from the mandrel 410 or tooling for further processing.

The mandrel 410 includes a guide 412, tooling portion 414 and a clamping region 416 at one end thereof.

The guide 412 is shaped to readily receive the open end of a braided tube 312 of CMC fibres and as such has a feed-on portion which is tapered or torpedo shaped having a continually increasing cross-section along its length from a rounded nose 418 towards the end of the guide portion which is proximal to the tooling portion 414. In this example, the guide 412 has a stepped profile to provide a plurality of flat portions 420 along the taper. The flat portions 420 provide a platform against which the cut end of the braided layers can be securely fastened prior to the subsequent layer being fed over the mandrel 410.

The manner in which the cut end is clamped to a step can be any suitable one such as a flexible tie, or a band clamp for example (wound fibre interlayer). In most cases the guide 412 will include as many steps 420 as layers, and the first layer will be secured to the step closest to the tooling portion 414 so as to leave the remaining steps exposed for subsequent layers. It will be appreciated that the stepped profile may take any suitable form. As such, the steps may be provided by the ridges, notches, grooves or undulations along the general length of the taper, rather than the flat portions shown in FIG. 4. Further, the riser or radial offset of the steps will be sufficient to allow the layers and fixation device to be held below the general plane of the guide to prevent fouling with successive layers and the uneven build-up of material.

The general profile of mandrel guide may start round/cylindrical to match the fibre braid before transforming along its length to match the NGP body which, in the described example will have an approximate box-like section corresponding to the aforementioned passageway.

Portions of the guide 412, tooling portion 414 or clamping portion 416 may provide additional zones for non-working faces of the NGP lay-up which can be used for tooling to be attached, such as the external tooling to clamp the fibres, or run-off areas which allow for the planarisation and removal of unwanted non-uniformities or irregular distributions outside of the working surfaces or other critical areas.

The tooling portion 414 of the example shown in FIG. 4 is generally cuboidal having shaped external surfaces which correspond to NGP internal working surfaces and some additional non-working surfaces. One side of the tooling portion 414 includes a depression 422 which corresponds to the suction surface 442 of a first vane, whilst the opposing convex surface (which is obscured from view) provides the pressure surface of a second, adjacent, vane. The two remaining lateral surfaces 426 correspond to the radially inner 216 and outer 218 platform surfaces. As mentioned above, the platforms extend fore and aft of the vanes 214 so as to provide the inlet 430 and outlet 430 portions which form the annular inlet 220 and outlet 222 of the assembled NGV arrangement.

It will be noted that the tooling portion 414 is substantially box-like in section with walls extending on each side between upstream and downstream ends thereof. It will be noted that box-like sections of consolidated CMC as presented on the mandrel are removed and attached together into an annular array, the walls which extend radially between the inner and outer platforms upstream and downstream of the leading and trailing edge respectively, would result in the annular inlet 220 and outlet 222 of the NGV 212 arrangement being circumferentially compartmentalised, which is generally undesirable. Hence, sections of the walls need to be removed to allow the desired construction of the NGV arrangement 212. As such these walls can be considered as non-working or extraneous surfaces which may simply be cut away after the consolidation process, or utilised to provide attachment, sealing or joining features. Such features may be created either or both before and after consolidation.

The clamping region 416 at the downstream end of the mandrel 410 is used to provide an anchor point to which each free end of the fibre layers can be clamped. The clamping mechanism may be any suitable type which retains the braid in place. Thus, in the described example, the clamping region 416 is provided by having substantially flat portions on each respective face around which a tie can be secured. The tie can be any suitable material and may be a ceramic fibre. It will be appreciated that each of the portions of the mandrel 410 may include additional features to aid with the clamping or retention of the fibre layers.

The guide 412, tooling portion 414 and clamping region 416 are serially arranged in distinct portions where are separably connectable to allow the mandrel 410 to be disassembled. The portions are connected together by members 428 having a narrower section so as to provide a valley to axially separate the portions of the mandrel 410. In the example, the members 428 are rod-like connectors which extend along the longitudinal axis of the mandrel 410 and which are threadingly engaged at each end by a respective portion of the mandrel 410. Other mechanisms for attaching the sections will be apparent to the skilled person.

It is also to be noted that the tooling portion 414 is an assembly of aggregate parts which can be disassembled from within the consolidated NGP to allow it to be inserted and withdrawn from the re-entrant features provided by the surface contouring. In this example, the tooling portion 414 is a segmented body having a plurality of parts and a key which is axially withdrawn prior to the removal of the other parts. The key part is locked in place when the connecting rod is threadingly engaged. As the tooling is supporting the fibre it must be capable of going through the manufacturing process, for example graphite. However, a structural core may be used to support the tooling assembly to be removed prior to consolidation of the CMC. Another option may be to make the mandrel from a sacrificial material such that it can be thermally, mechanical or chemically removed using an appropriate technique, the material of which will be application specific. The assembled mandrel may be made from graphite.

Figure 3A:
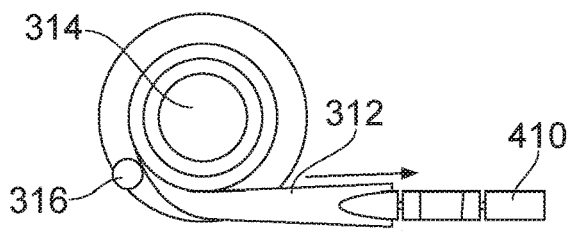
FIGS. 3a to 3e show the process steps used to create a nozzle guide passage of the present invention.
Figure 3B:
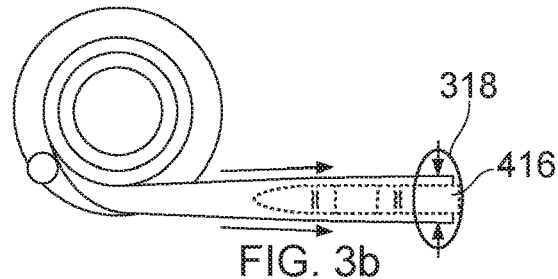

FIG. 3*a* shows the mandrel 410 in position and ready to receive a first layer of ceramic fibre braid 312. The braid is dispensed from the rotating spool 314, expanded to receive the rounded nose 418 of the guide 412 and fed over the mandrel 410. Once the correct amount of braid 312 has been loaded on to the mandrel 410, the free end is clamped at the clamping region 416 (FIG. 3*b*) using a suitable clamping mechanism in the form of a tie 318.

Figure 3C:
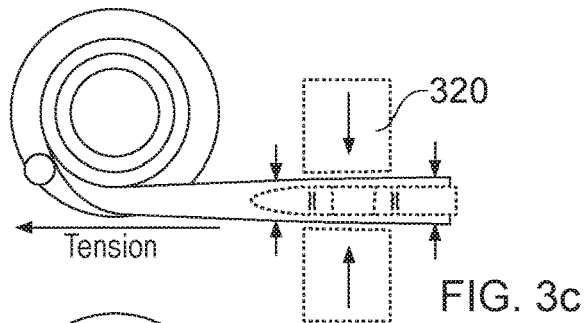

Once clamped, the braid 312 is then lightly tensioned by reverse rotation of the spool 314 which causes the braid 312 to constrict around the mandrel 410. This process may be supplemented with an additional tensioning device proximate to the mandrel to minimise fibre distortion. A lateral press 320 is applied to the braid 312 whilst under tension to ensure that the fibres conform to the required mandrel surfaces, such as the working surfaces, and any underlying braided layers (FIG. 3c). In providing the conformity, the lateral press 320 is compressing the braided tube and distorting the fibres relative to one another such that the appropriate shape of the NGP is achieved with each layer, prior a subsequent layer being fed over the top. As such, the lateral press 320 is an intermittent compression step which is repeatedly applied and released in between individual braided layers. The intermittent compression is distinct from the external tooling which is applied for the consolidation process as described below. However, it will be appreciated that in some embodiments, it may be beneficial to use the same dies for the intermittent compression as are used for consolidation tooling.

Depending on the complexity of the geometry, it may be preferable for the lateral press 320 to be provided by a deformable or mouldable material which conforms to the shape of the tooling upon compression. The lateral press 320 may be an inflatable bag or sleeve which allows for the increasing thickness of the layered component.

Figure 3D:
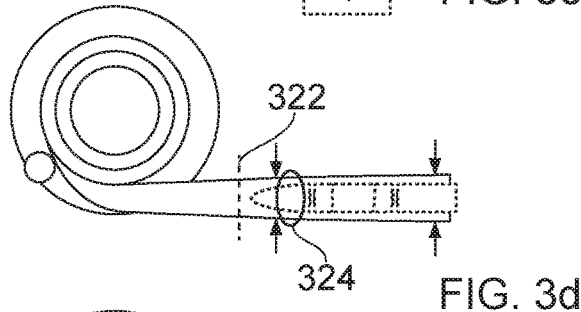

Once in place, the braid 312 is clamped to a step of the guide with a further clamping mechanism, for example, another tie 324, and cut at the dashed line 322 (FIG. 3d). This may be done after release of the lateral press 320 but is preferably done during the press to ensure the braid is not disturbed during the clamping and cutting operation.

In addition or alternatively, the tooling could have a vacuum applied to draw the fibre onto the tool face. Once the external tooling have been applied the vacuum should minimise the movement of the fibre allowing for inspection. The surface of the fibre lay-up may also have an adhesive applied thereto to temporally hold the fibre in position. The adhesive may be sprayed onto the surface then the consolidation applied. The tooling could additionally include heating elements to temporally fix the fibres in place.

The cut 322 of the braid 312 marks the end of the lay-up for an individual braided layer. If another layer is required, the process is repeated by feeding the braided tube back over the mandrel and braided layer or layers which have already been laid up. This process is repeated until the desired numbers of layers has been achieved.

Figure 3E:
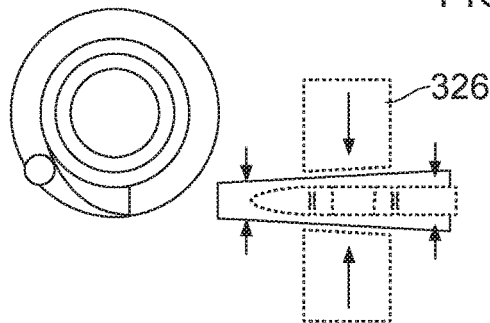

Once all of the layers have been laid-up on the mandrel 410, a final compression is carried out prior to consolidation tooling 326 being applied to the exterior of the pre-form (FIG. 3e). The consolidation tooling 326 compresses the fibre pre-form to a greater tolerance to control the critical dimensions of the component at various locations. The consolidation tooling may include a plurality of passages through which gas can follow in order for the consolidation process to be carried. The consolidation tooling 326 remains in place until the consolidation process is complete.

Figure 7:
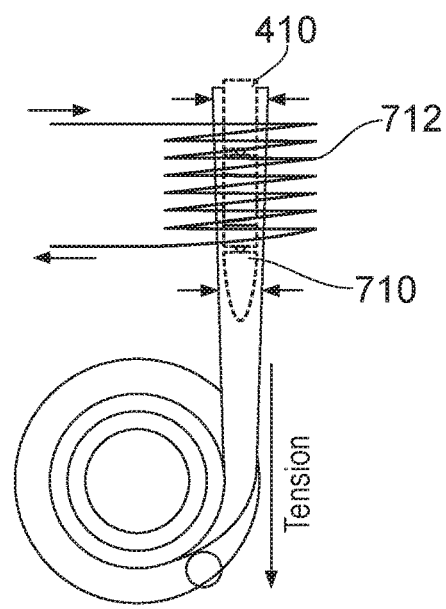
FIG. 7 shows a binding fibre wound around a plurality of layers.

It will be appreciated that the above process may be altered to suit a particular architecture of component. As such, the intermediate compression tooling may not be required or applied for some layers. Also, further inter-braid plys or fibres may be added to the pre-form during lay-up so that specific regions may be reinforced as required. Such additional plys or fibres may be mechanically retained in place, or held with adhesive. This additional process is shown in FIG. 7 where the pre-form of fibre layers 710 is wrapped with an individual or bundle of fibres 712 in a helical fashion. Such a fibre or fibres 712 can be for reinforcing the composite structure, or simply to ensure conformity of the braids to the mandrel shape and to secure them in place. The application of the wrapped fibres may be achieved by rotating the mandrel 410 whilst traversing the length of the mandrel 410 with a separate spool (not shown). It will be appreciated that this fibre 712 is not a true helical formation due to the straight sides of the mandrel 410. However, it is helical to the extent that the fibre encircles the outside of the mandrel 410 whilst traversing the longitudinal length thereof.

The fibres applied to the mandrel as part of the braid will be similarly helical in form, extending around and axially down the mandrel simultaneously. The axial inclination of the braided fibres to the normal of the longitudinal axis will vary depending on the size of the braid and the shape of the mandrel. The additional fibres or bundles of fibres may be aligned at any necessary angle and may, for example, be any one or more of parallel to the longitudinal axis, wrapped around the mandrel on a circumferential line which is normal to the longitudinal axis, or helical. Further, the fibres may be applied as strips or patches of a regular or irregular shape depending on the shape and requirements of the component.

Figure 6:
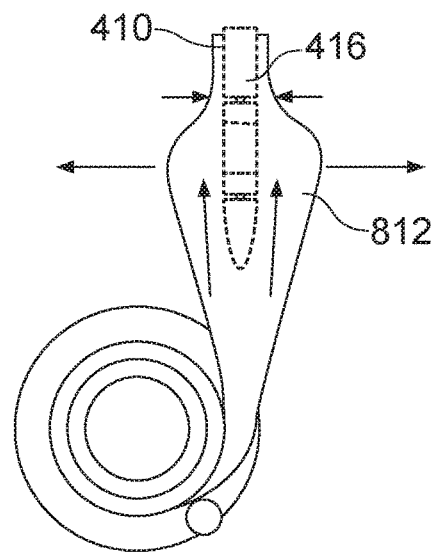
FIG. 6 shows an overlay of fibres being placed on a mandrel.

To aid the lay-up of the individual braided layers, the open end of the braid is flared prior to being inserted over the mandrel 410. Once the free end is attached to the clamping region 416, an optional additional step is to expand the diameter of the braid 812 as shown in FIG. 6. The expansion of the braid may be achieved by feeding excessive length on to the mandrel which will force an increase in diameter as indicated by the arrows in FIG. 6.

Expanding the braid 812 in this way allows it to be rolled down to conform with the mandrel 410 or existing layers ensuring the lay-up is unobstructed prior to the tension and lateral compression being applied. The roll down of the braid 812 may be accomplished by a tool which travels from the clamping end towards the guide. The tool may be a collar or one or more arms which constricts around and conforms to the mandrel 410, or may be the inflatable lateral press described above which is partitioned so as to be inflatable in segments.

FIGS. 5a and 5b show the clamping of the consolidation tooling 510. Although the pre-form undergoes optional intermediate clamping in between individual braids being laid up as described above, the consolidation tooling 510 applies a greater degree of pressure to ensure the correct dimensions are achieved. As such, the consolidation tooling 510 clamps the layers of braid 512 and urge them into compliance with the underlying surface in some areas, with some fibres realigning and generally distorting in other areas to provide any additional length required. Subsequent steps see these other areas clamped prior to consolidation, where required.

To improve the quality of the final component, the consolidation tooling 510 is applied to the most complex or shape-critical regions first, with less important regions being subsequently clamped. In the described embodiment, the critical surfaces or parts are the mating surfaces which lie towards or between the leading 514 and trailing 516 edges, and the profile of the pressure surface 518 and suction surface 520. Thus, the external tooling is brought into contact and compresses the layers 512 in these areas prior to applying the tooling to the radially outer and inner platform regions. It will be appreciated that it may be advantageous to apply the tooling one side at a time, or in opposing compressive pairs. In the case of the former, it will be understood that the mandrel will be restrained at the proximal, and optionally distal, end such that a suitable compressive force might be reacted. Thus, FIG. 5b shows a first clamping step on the vane sides of the mandrel 410 to ensure conformity of vane profiles and the joining portions local to the leading 514 and trailing 516 edges. FIG. 5c shows a subsequent step providing clamping to the platform surfaces 522, 524.

It will be appreciated that the different parts of the exterior consolidation tooling may be attached to one another and to the mandrel using one or more external clamps or attachments or locating features. For example, the different parts may be located with corresponding external ball and socket attachments before being bolted together. Further, the consolidation tooling 510 may incorporate extraneous features to accommodate more complex external diameters, such as the attachment lugs or internal walls as described below.

Once clamped, the consolidation tooling 510 remains in place until the layers 512 have been consolidated. The consolidation processing steps required once the fibres have been laid up will depend on the CMC system being implemented. Assuming a SiC/SiC CMC system is employed, it is necessary to infiltrate the fibres with the appropriate matrix. One option is to use a gaseous process such as CVI, or alternatively a melt infiltrate or other matrix precursor applied to the fibre or interlayer. For an oxide system, the braid is either pre-impregnated with the matrix constituents and a binder which are dried at a moderately low temperature to consolidate the layers.

To enable a gaseous flow through the layers of the pre-formed component, the mandrel 410 and compression tooling 510 may be provided with a plurality of gas flow passages which allow a flow of gas to be passed through the fibres 512. Thus, as shown in FIG. 5a, the mandrel 410 has a hollow interior which provides a gas flow path. The exterior walls of the mandrel 410 include a plurality of flow apertures 528 which extend from the hollow interior to the exterior of the mandrel 410 and the interface of the fibre layers 512. Thus there is provided a gas path into the fibre layers.

Corresponding vacuum flow apertures 526 are also provided in the exterior tooling to allow the gas to be exhausted (or fed in) or circulated. The flow apertures 528 in the mandrel 410 and exterior tooling 510 may be concentrically aligned, or may be offset either axially or transversely, so that there is no direct path between the flow passages through the component wall. The offset arrangement means that the gas path extends along the plane of the NGP wall in one or more directions and between opposing walls of the mandrel 410 and consolidation tooling 510. Hence, in use, gas enters the layers via a flow aperture in either the exterior consolidation tooling or mandrel, into the braid layers, longitudinally along the braid layers between the walls of the exterior tooling 510 and mandrel 410, prior to being exhausted via the flow aperture of the other of the mandrel 410 or exterior tooling 510. It will be appreciated that the tooling will include the necessary features and adaptions to allow it to be connected to suitable gas supply and extraction equipment as required.

It will be appreciated that the arrangement of the flow passages in the mandrel 410 and tooling 510 will be as required to achieve the correct flow conditions. Thus, there will likely be an array of flow passages on the interior and exterior surfaces, with specific portions having a higher density of passages, such as at corner regions where the surface to volume ratio is reduced.

The flow of gas is maintained until the desired porosity has been reached and the NGP is at least rigid enough for removal from the tooling and subsequent handing.

Once the component has been consolidated, the exterior tooling 510 and mandrel 410 can be removed. The way in which this is achieved will depend on the profile of the component and the construction of the tooling 510 and mandrel 410. Where there are no re-entrant features it may be possible to remove the mandrel 410 simply by withdrawing it from the internal cavity of the component. In the case where the mandrel cannot be withdrawn, as is the case for the described examples here, the mandrel 410 will be made from multiple die parts 410*a,b,c,d* as required to provide the necessary shape. The mandrel 410 may be made from graphite and provided as a multi-part construction which can be removed piecewise after consolidation.

The mandrel 410 shown in FIG. 5a includes five parts by way of example. The first part is a central section which has been removed to provide the internal flow path for the gaseous flow. This is part can be removed once the preforma has been constructed from the layers. The remaining four components each correspond principally to one of the external sides of the mandrel. The upper and lower sections of the mandrel as viewed are flanked by the lateral sections of the mandrel. The parting line 530 between the corresponding sections provides a taper suitable for the upper and lower sections to be withdrawn into the flow passage away from the wall of the component. It will be appreciated that in such an arrangement, there may be the need for a latch or key to prevent the section of mandrel inadvertently moving away from the wall prior to consolidation of the component. Once the upper and lower sections have been removed, the side or lateral sections of the mandrel can be rotated into the central portion away from the wall and removed.

Returning to FIGS. 2a and 2b, it can be seen that the nozzle guide passages include ancillary features in the form of attachment lugs 252 which provide mechanical attachments with which circumferentially adjacent NGPs can be attached to one another. It is important to ensure that the adjacent passageways can be satisfactorily joined to one another so as to provide integrity sufficient to withstand the operating conditions such as extreme temperatures, pressures and vibration, and to locate the components with sufficient accuracy and robustness to enable sealing between the components.

Figure 8A:
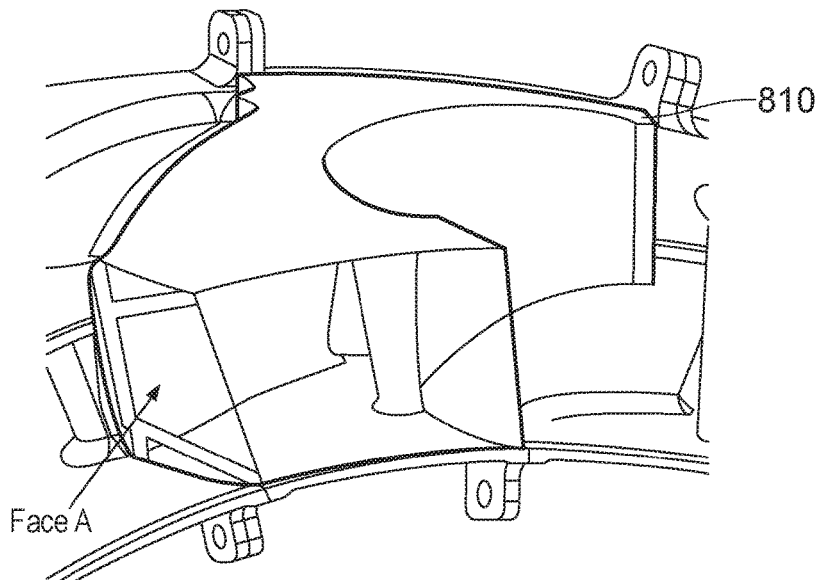
FIGS. 8a, 8b & 8c and 9a & 9b show constructional details of different NGP arrangements.
Figure 8B:
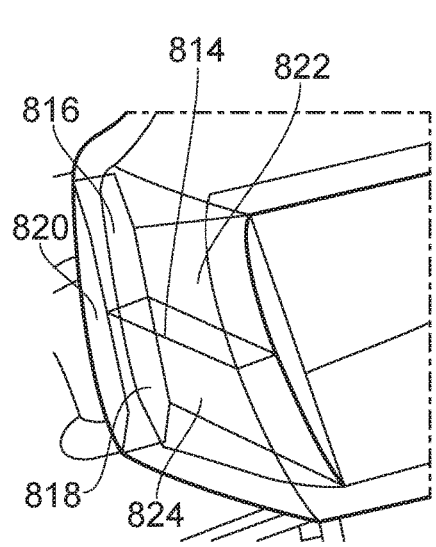
Figure 8C:
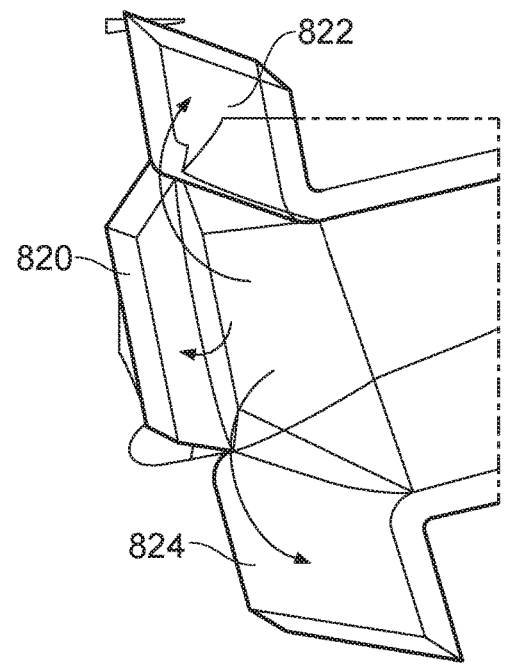

One option to assist with assembly of the NGV annulus from the individual NGPs is to utilise the extraneous end regions of the passageway pre-forms to provide ancillary features for sealing, attaching and cooling. FIGS. 8a-c show a passageway having non-working surfaces of the NGP. These extraneous portions are cut and re-orientated prior to the application of the consolidation tooling.

Hence, in one example as shown in FIGS. 8a and 8b, Face A on the upstream end of the passage inlet is cut to provide attachment lugs which correspond to similar attachment lugs on adjacent passageways. To produce the attachment lugs, the extraneous end portion is cut axially along a radial midline of the passageway to produce cut 814. Radial cuts 816, 818 are made at the terminal end of the axial cut 814 so as to define a first flap 820 which is joined local to the pressure surface leading edge of the vane, and two attachment flaps 822, 824 which are turned out to provide a radially projecting flap on the radially inner and outer platforms respectively.

The attachment flaps 822, 824 are bent of the plane of the extraneous wall so that they are aligned to extend approximately radially outwards relative to the principal axis of the engine. External tooling is applied as required to maintain the structural position and shape of the lugs prior to consolidation.

The first flap 820 provides a sealing portion which extends from an area local to the leading edge of the vane and which is folded back so as to lie adjacent with what will be the interior wall of the pressure surface of the vane when assembled. The folded back portion provides an increased thickness along the interfacing surfaces between the two circumferentially adjacent NGPs and can be presented either inside or outside of the suction surface component of the adjacent NGP. As will be appreciated, this flap may be machined to provide a close tolerance fit, or a mating feature such as a rebate or the like. The joining flap is clamped in a similar fashion to the attachment lug flaps once in the correct position and prior to the consolidation process.

Figure 9A:
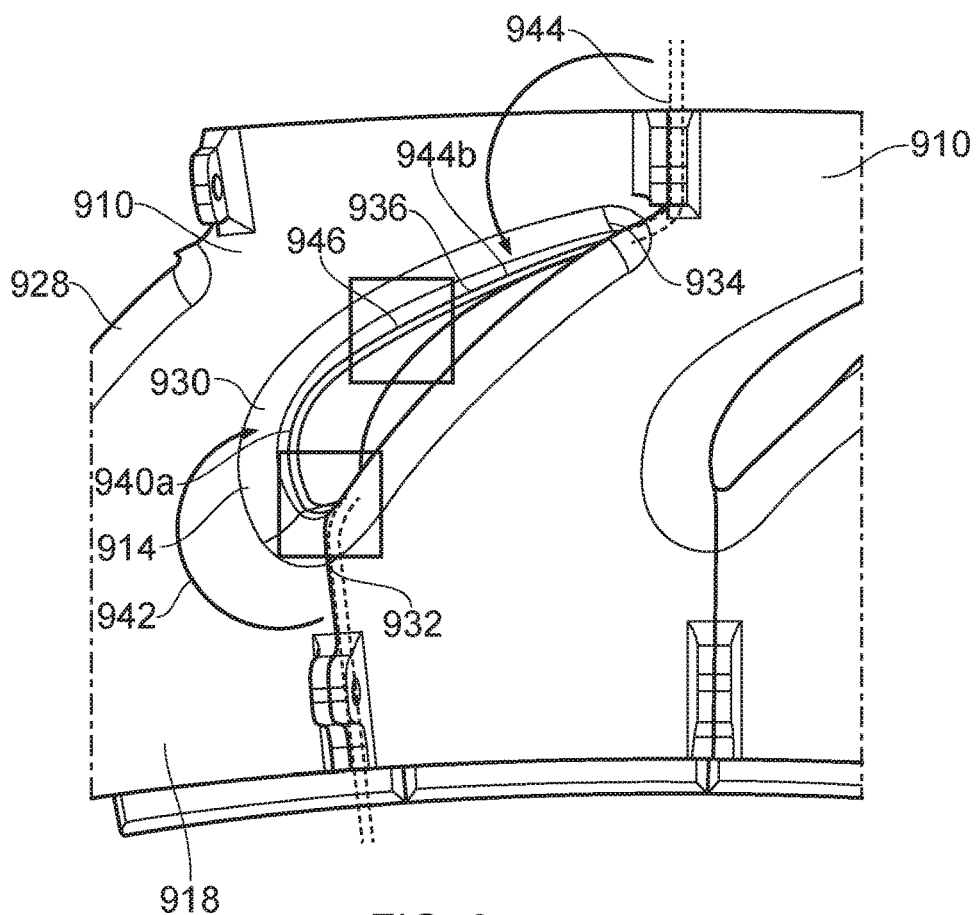
Figure 9B:
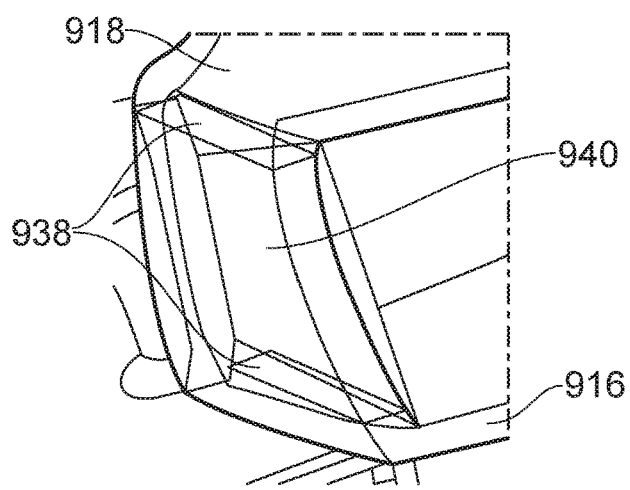

FIGS. 9a and 9b show a portion of a nozzle vane guide which is constructed from a plurality of separate NGPs joined together in an annular array. Each NGP 910 includes an inner 916 and outer 918 radial platform, a suction surface 930 of a first vane passage, and a pressure surface 928 of a second vane passage. The suction and pressure surfaces extend between respective leading 932 and trailing 934 edge portions. In this way, each vane 914 in the annular array includes a pressure surface of a first nozzle guide passage and a suction surface of a second nozzle guide passage.

Each vane 914 includes an internal wall 936 which is an integral part of either the first or second NGP 910. In the example shown, the integral wall 936 is a continuation of the pressure surface 928 and as such is a seamless or joint free continuation thereof. Where the CMC material is fabricated from elongate fibres such as those used in the braid described above, the integral wall includes continuous fibres extending from the working surface of the vane, i.e. the pressure surface in this example, into the internal wall.

To produce the internal wall 936 an extraneous portion of the NGP pre-form is provided with two axially extending incisions 938 which are radially located toward the inner and outer platform areas, as shown in FIG. 9b. The incisions define a tongue 940 having a substantially rectilinear form with a free end and an integral which extends from the leading edge 932 toward the most upstream portion of the pre-formed component and which is formed from surfaces of the pre-form which are extraneous to the working surfaces of the nozzle guide passage. Thus, there is provided a tongue or flap which can be manipulated into a desired position prior to consolidation or the application of consolidation tooling.

Once cut, the tongue 940 can be turned away from the flow passage of the NGP 910 and back towards the trailing edge 934 as depicted by arrow 942. The position and shaping of the tongue 940 is such that it corresponds to the internal geometry of the opposing suction surface 930 of the adjacent NGP 910, or some other preferable form. A similar tongue 944 can be produced at the trailing edge 934 of the component using a similar process. Thus, the trailing edge tongue 944 is cut from an extraneous portion of the pre-formed component whilst remaining integrally connected along the trailing edge 934. The trailing edge tongue 944 is manipulated forwards towards the leading edge and ultimately held in a spaced relation to the internal suction surface wall 936 of the adjacent NGP.

As described in this example, once the respective leading 940 and trailing edge tongues 944 have been cut and folded back on themselves, they are arranged to meet at an internal mid-portion within the vane 914. Joining the two respective tongues 940, 944 together will provide an internal wall 936 within the vane cavity.

Such a wall can be created from either or both of a wall which extends in a downstream direction from a region local to the leading edge 932 and a wall which extends in an upstream direction from a region local to the trailing edge 934.

It will be appreciated that an integrally formed wall may be utilised for different purposes. One purpose may be to provide a heat shield within the vane 914. Another is to provide a cooling passage for channeling cooling air within the vane 914. Either or both of these uses may be better served by having the internal wall 936 extending parallel to the external gas facing surface of the vane 914 but this need not be so.

In the example provided in FIG. 9, the leading 940a and trailing 944b edge inner walls meet and join along a radial length at an approximate mid-chord portion of the vane 914 so as to provide a single internal wall 936 structure. The join 946 may be affected using different techniques including, but not limited to, a butt joint, a lapped joint in which either or both of the internal walls 940a, 944a include a rebate or chamfer to receive corresponding portion of the opposing wall, or more complex formations which involve the interlacing of fibres. It will be appreciated that additional fibre ply may be laid over the top of the joint to increase the strength of the join or a suitable ceramic cement may be used if the application allows it. Other configurations of join may include corresponding castellation or saw tooth profiles which intermesh with one another.

Although the above example describes the joint 946 being provided local to the mid-chord portion, it will be appreciated that this can be varied as required by a particular application. Further, although the internal wall 936 of the embodiment is shown as including two wall portions 940a, 944a, this may not be the case and there may be one only which extends around from the leading or trailing edge. Such a wall may extend the full chord of the vane 914 and join the other of the leading 932 or trailing 934 edge, or may only extend through part of the chord.

Either of the walls extending from the leading 932 or trailing 934 edge may loop around on itself to join or abut a wall of the nozzle guide vane 912 of which it is an integral part. Thus, a tube or conduit can be formed which extends from a radially outer platform to a radially inner platform. In some instances, a portion of such a wall would be provided by an internal surface of a working surface of the vane, such as the pressure surface, and the internal, integral wall portion which extends from the leading or trailing edge as the case may be. Alternatively, the tube or conduit may be defined entirely by the internal wall itself. In this case, the integral wall will turn through at least 180 degrees so that a proximal portion of the wall, relative to the vane wall from which it extends, abuts or mates with a distal portion.

The internal wall 936 described above in connection with FIGS. 9a and 9b may one or more of a structurally reinforcing element, a heat shield or a channel to receive cooling air. The channel may be a conduit for cooling air and as such may be fluidically proximate or connectable to an inlet manifold or plenum.

An alternative to the above construction is to provide the internal wall 936 with a discontinuity. Such a discontinuity may be provided by having a separating gap between the respective leading and trailing edge wall portions 940a, 944a. Here, the integral walls 940a, 944a may provide reinforcing elements or sealing surfaces to help seal the interface between opposing vane passage walls, which are shown as lying along the trailing and leading edges in FIG. 9a.

In some applications, the internal wall may include additional features which space the internal wall from the interior surface of the working surface of the vane. These features may include protruding features which extend from the planar face of the internal wall. The protruding features may include round pedestals or bumps, or strips etc.

In the described embodiment, the internal wall 936, or the portions of internal wall 936 are made by cutting the pre-form of lay-ups prior to consolidation of the plys so as to provide appropriate flaps which can be re-oriented to create the required feature. Once the plys, or individual fibres have been removed and the remaining portions manipulated into the new positions, consolidation tooling can be applied so as to hold the flaps in place.

As with the previously described embodiments, the consolidation tooling can include one or more parts to allow assembly within the internal passage or space created by the internal wall and to define the exterior wall. Further the tooling may include any gas flow apertures required for a chemical infiltration process.

Figure 10:
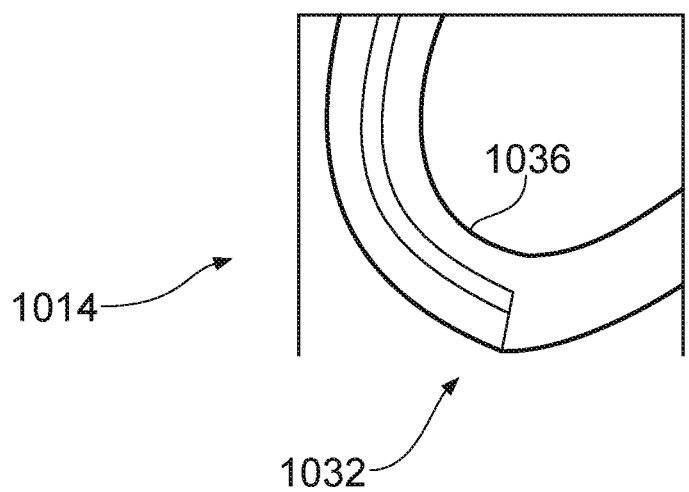
FIG. 10 shows a leading edge detail of a particular NGP.

FIG. 10 shows a partial section of a leading edge region 1032 of an assembled vane 1014 having a gas facing surface provided by a first nozzle guide passage, and an internal wall 1036 provided by a second, different, nozzle guide passage. The internal wall 1036 includes a recessed or rebated portion which defines a radially extending shoulder along the vane 1014. The shoulder provides mating surface which sealably receives the corresponding portion of the working surface of the adjacent vane passage wall. The rebate may extend along the full radial length of the internal wall, or only a portion thereof.

The rebate shown in FIG. 10 which provides the shoulder for sealably joining with the adjacent nozzle guide passage may be created via a machining process after consolidation, or a combination of machining and the removal of plys prior to consolidation. The spacing features may be machined into the consolidated wall once the tooling has been removed. Additional plys and or fibres will be added prior to the application of the external tooling.

It will be understood that the invention is not limited to the described examples and embodiments and various modifications and improvements can be made without departing from the concepts described herein and the scope of the claims. Except where mutually exclusive, any of the features may be employed separately or in combination with any other features and the disclosure extends to and includes all combinations and sub-combinations of one or more described features.

The invention claimed is:

1. A method of manufacturing a plurality of nozzle guide passages, the nozzle guide passages for assembly in an annular array to provide a nozzle guide vane arrangement for a gas turbine engine, each nozzle guide passage comprising radially inner and outer platforms, a suction surface of a first vane, and a pressure surface of a second vane such that each vane in the annular array includes a pressure surface of a first nozzle guide passage and a suction surface of a second nozzle guide vane, the method including the steps of:
   providing a tubular pre-form having a plurality of layers of unconsolidated CMC fibres in which the internal walls of the tubular preform provide either working surfaces which define the main gas path walls of the nozzle guide vane arrangement, or extraneous wall portions which do not provide working surfaces of the assembled nozzle guide vane arrangement;
   cutting the extraneous wall portions to provide one or more flaps which remain attached to the pre-form via a connecting portion of wall; and,
   displacing the flap from a first pre-cut position to a second consolidation position to provide one or more ancillary features.

2. A method as claimed in claim 1, wherein the nozzle guide vane passages include a flow direction which corresponds to the in use flow direction of the main gas path and wherein the extraneous wall portions extend radially between opposing inner and outer platforms and fore or aft from either of the pressure surface or the suction surface of each nozzle guide vane passage, the method further comprising:
   making a first cut along the flow length of the extraneous wall;
   making a second cut transverse to the flow direction so as to provide the flap with a connecting portion of wall adjacent and along either of an inner or an outer platform.

3. A method as claimed in claim 2, further comprising making a third cut transverse to the flow direction and in a radially opposite direction to the second cut.

4. A method as claimed in claim 2, further comprising providing the first and second cuts and optionally a third cut fore and aft of either or both of the pressure and suction surfaces of the pre-form.

5. A method as claimed in any of claim 2, wherein the second cut includes an axially extending portion to provide a sealing wall flap which includes a connecting wall portion local to the leading or trailing edge of either a pressure surface or suction surface to provide a leading or trailing edge flap.

6. A method as claimed in claim 1, wherein placing the flap in the consolidation position includes putting the flap in a radially outward or inward orientation relative to the respective platform so as to provide attachment lugs on the exterior of the nozzle guide passage.

7. A method as claimed in claim 1, wherein the nozzle guide vane passages include a flow direction which corresponds to the in use flow direction of the main gas path and wherein the extraneous wall portions extend radially between opposing inner and outer platforms and fore or aft from either of a pressure surface or a suction surface of each nozzle guide vane passage, the method further comprising:
   making a first cut along the flow length of the extraneous wall;
   making a second cut along the flow length of the extraneous wall;
   wherein the first and second cuts along the flow length of the extraneous wall portions are radially separated so as to provide a connecting wall portion local to any of the pressure or suction surface trailing and leading edges to provide a leading or trailing edge flap.

8. A method as claimed in claim 7, wherein the adjacent nozzle guide passages in the nozzle guide vane arrangement abut one another at a joining interface located at an upstream end and a downstream end of each nozzle guide passage, and a mid-portion of the nozzle guide passages is separated by an internal cavity of a vane, the method further comprising:
   reorienting the leading or trailing edge flap of the pressure or suction surface back on itself so as to be within the region which will provide internal cavity of the vane in the assembled nozzle guide vane arrangement.

9. A method as claimed in claim 8 wherein the leading or trailing edge flap is shaped to correspond to the internal surface of the opposing suction or pressure surface of the adjacent nozzle guide vane passage which is mateable with the adjacent nozzle guide vane to provide a sealing wall in the assembled nozzle guide vane.

10. A method as claimed in claim 8, further comprising consolidating the pre-form and machining a recess in the sealing wall to provide a rebate for receiving a portion of the opposing corresponding pressure or suction surface wall during assembly of the nozzle guide vane passage.

11. A method as claimed in claim 7, wherein first and second cuts are radially removed from the inner and outer platforms to connecting wall portions along the inner and outer platform walls thereby providing an attachment lug flap and wherein placing the flap in the consolidation position includes putting the attachment lug flap in a radially outward or inward orientation relative to the respective platform so as to provide attachment lugs on the exterior of the nozzle guide passage.

12. A method according to claim 1 wherein the formation of the tubular preform comprises:
a) providing a mandrel;
b) feeding a tube of ceramic fibres over the mandrel, wherein the tube comprises an interwoven matrix of fibres which extend radially, circumferentially and axially around the nozzle guide passage;
c) repeating step b) until a predetermined number of layers has been laid-up on the mandrel to provide the tubular pre-form.

13. A method as claimed in claim 12, further comprising:
d) consolidating the ceramic fibres; and,
e) removing the mandrel.

14. A method as claimed in claim 13, further comprising laying down one or more of: interlayer individual fibres, fibre bundles or fibre plys in between tubes of fibres wherein the inter-layer fibres or fibre plys are one or more of: wound around the outside of a preceding layer a plurality of times at a common axial location relative to the longitudinal axis of the mandrel; wound around the outside of the preceding layer whilst extending along the longitudinal axis; and, extending longitudinally along the mandrel in a direction which is common to the longitudinal axis of the mandrel.

15. A method of constructing a nozzle guide arrangement comprising a plurality of nozzle guide passages using the method of claim 1, assembling the nozzle guide passages to provide a nozzle guide arrangement.

* * * * *